Aug. 29, 1950 H. G. LUNDGREN ET AL 2,520,284
TIME ANNOUNCING PHONOGRAPH
Filed Dec. 9, 1944 6 Sheets-Sheet 5

INVENTORS,
HARRY G. LUNDGREN.
ERIC H. LUNDGREN.
BY
Naylor and Lassagne
ATTORNEYS

INVENTORS,
HARRY G. LUNDGREN.
ERIC H. LUNDGREN.

BY Naylor and Lassagne
ATTORNEYS

Patented Aug. 29, 1950

2,520,284

UNITED STATES PATENT OFFICE 2,520,284

TIME ANNOUNCING PHONOGRAPH

Harry G. Lundgren and Eric H. Lundgren, Oakland, Calif.

Application December 9, 1944, Serial No. 567,464

8 Claims. (Cl. 274—10)

This invention relates to machines for automatically and periodically announcing the correct time or other information by voice.

Records are provided on which voice recordings are made for a predetermined set of times of day, for example, at half-minute intervals, and such recordings may be in the nature of "twelve o'clock," "one half-minute past twelve," "one minute past twelve," and so on, until the cycle of time of a twelve hour period is completed. The words "when you hear the gong the correct time will be" may precede the words expressing the time, which may be followed at the proper moment by the sound of a gong; or the announcement may be of any other suitable type, whether or not it includes advertising or other information. The recordings are so spaced along the path of the pickup needle that they will begin to be reproduced by the pickup means at half-minute intervals, or other intervals if preferred, and at the correct time for each announcement or reproduction. All of such recordings for a twelve hour period may be on a single record, or they may be divided between as many records as may be found desirable. As a matter of practicability it is generally preferred to have four records, the first having thereon the recordings from one half-minute past twelve to three o'clock, the second from one half-minute past three to six o'clock, the third from one half-minute past six to nine o'clock, and the fourth from one half-minute past nine to twelve o'clock. It is preferred to use sixteen inch disc records, but recordings at one half-minute intervals will not be conveniently accommodated by them to cover a period of more than three hours each. "a. m." and "p. m." are preferably omitted from the recordings since practically everybody knows almost instinctively whether the announced time is a. m. or p. m. If desired, however, there can be two sets of records, to correspond to a twenty-four hour clock, or one for a. m. time and one for p. m. time, whether the twelve hour periods be each on one or more records.

Objects of the invention are to provide mechanism which will play the record or records to announce the proper time; play the records, if there are more than one in a set, in the proper sequence; repeat periodically the playing of each record at the proper time; keep all the records of a set silent except the proper one to be played; and accomplish all such objects automatically; to provide means to start correct time announcements at any desired time; to provide records of the type described above; to provide disc records of such type which will play outwardly toward the periphery; to provide cooperating elements on the machine and record or records to move the pickup needle or needles from their positions at the end of the recording and position them properly at the beginning of the recording; and other objects will be apparent on reading this specification taken in connection with the accompanying drawings which illustrate an exemplification of the invention and form a part hereof. On such drawings Figure 1 is a front elevation of the machine showing a record in place on each turntable;

Figure 1:
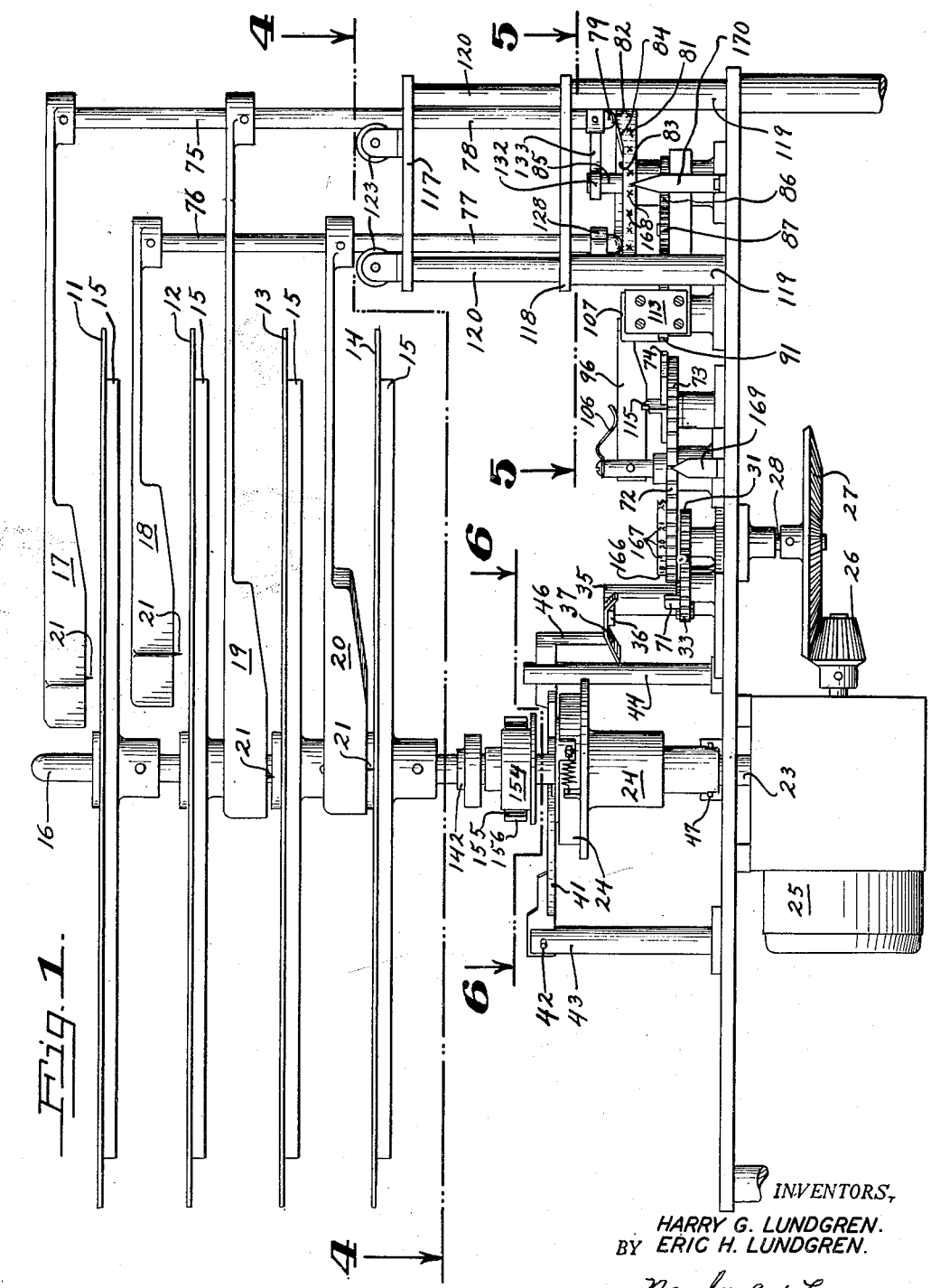

In the exemplification of the invention illustrated in the figures of the drawings, there are four records 11, 12, 13 and 14, each carried by a separate turntable 15, all of which are mounted on a common shaft 16. Separate pickup devices 17, 18, 19 and 20 are provided for the records 11—14, respectively. Each pickup device includes a conventional pickup needle 21, and amplification of the reproduced sounds may be by conventional means. The shaft 16 is rotated periodically for a time long enough to make the proper announcement, and preferably through two revolutions of the record. Not more than one of the pickup devices contacts a record at the same time so that only the proper announcement will be made, although all of the records are rotated simultaneously. A shaft 23 and a flywheel 24 thereon are continuously rotated at a speed of 33⅓ R. P. M. through gearing (not shown) by a synchronized motor 25 or by any other suitable means in timed relation to other parts driven by such motor and which will be referred to hereafter. The shafts 16 and 23 are axial of each other, end to end, with an interposed ball bearing 25a to permit the relative rotation between such shafts. A clutch mechanism, to be described hereafter, is carried by the flywheel 24 to clutch the shafts 16 and 23 together at the proper time and for the proper period, to cause the records to be rotated through two revolutions at a speed of 33⅓ R. P. M. This speed of rotation is chosen because it is the conventional speed of phonograph records used for radio broadcasting, but it may be altered to suit other types of records as required.

The motor 25, through suitable coordinated gears 26 and 27 can rotate a shaft 28 to which is fixed a gear 31 so that this gear rotates at 1 R. P. M. A suitably mounted gear 32 is rotatable at 1 R. P. M. by the gear 31. A suitably mounted gear 33 is rotated at 1 R. P. M. by the gear 32 which also rotates a suitably mounted gear 34 at 2 R. P. M. The gear 34 is mounted on a shaft 35 and an arm 36 carrying a cam 37 is also affixed to the shaft 35. For properly timing the parts actuated thereby, the gears 31, 32 and 33 have thirty teeth each and the gear 34 has fifteen teeth. The cam 37 causes the clutching together of the shafts 16 and 23 during a part of the revolution of the cam for a period equal to two revolutions of such shafts. An arm 41 (Figures 1, 4 and 6) is connected at one end thereof by a pivot 42 to a standard 43, to swing vertically about such pivot. An upstanding member 44, slotted at its upper end, provides a guideway for the arm 41 adjacent the other end thereof. The lower end of a downwardly extending end 46 of the arm 41 is contacted by the cam 37 to raise such arm and maintain it raised. This cam is so shaped as to hold up the arm 41 for the period of time required to cause two revolutions of the shaft 16 by clutching it to the driven shaft 23, as will appear hereinafter.

Figure 6:
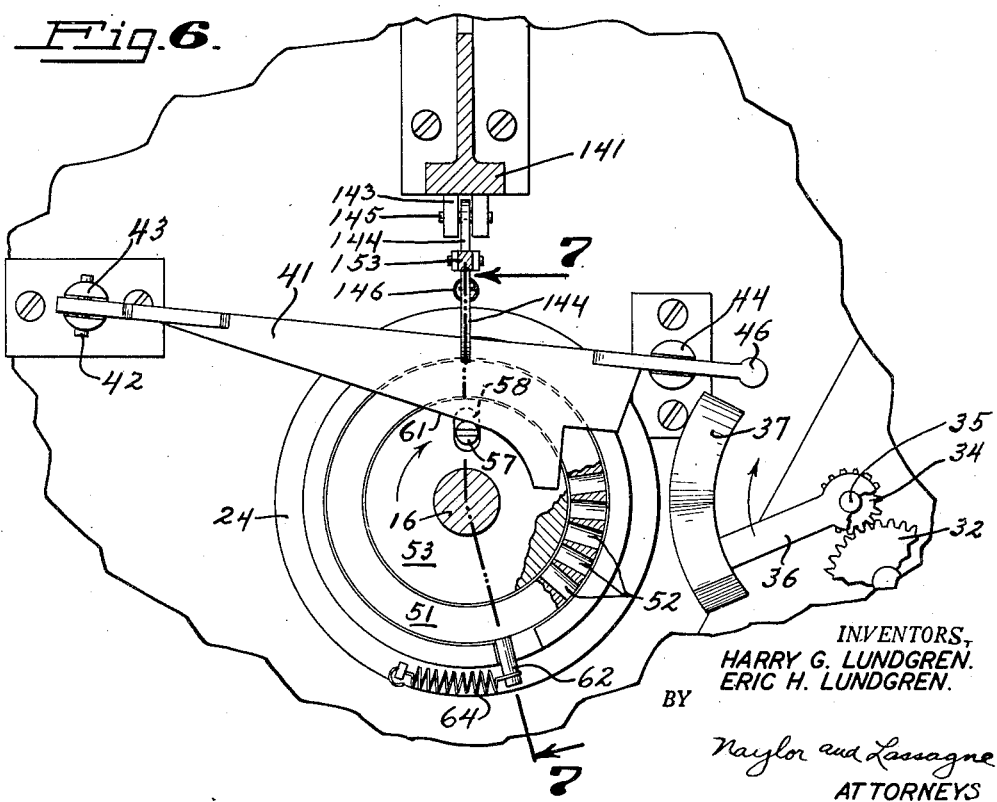
Figure 6 is a horizontal section broken away and on an enlarged scale, on the line 6—6 on Figure 1.
Figure 7:
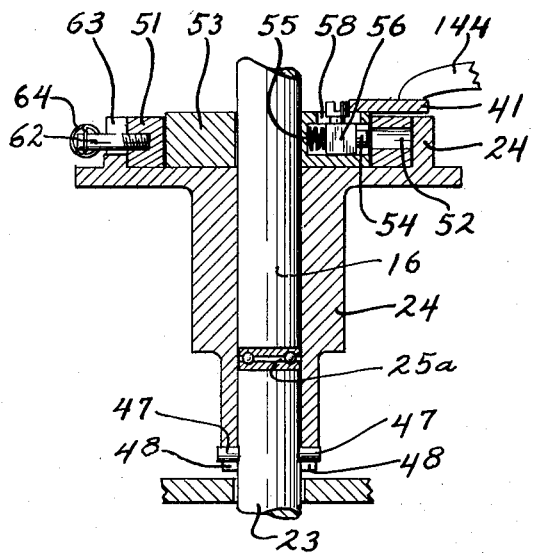
Figure 7 is a vertical section on a scale similar to that of Figure 6 on the line 7—7 thereon.

The flywheel 24 may be attached for revolution to the shaft 23 in any suitable manner. Conveniently, the shaft 23 carries projecting studs 47. The flywheel has notches 48 at the lower part thereof, and can be slipped over the shaft with the studs in the notches. The flywheel is hollow, and within it is a ring 51 having a series of radial holes 52 therein (Figures 6 and 7). Within the ring 52 is a disc 53, affixed to the upper shaft 16. A pin 54, carried by a slidable member 56, is located in a cavity in the disc 53, and is urged outwardly by a spring 55 to enter a hole 52. A screw or other projecting member 57 attached to the member 56 extends through an elongated slot 58 in the upper face of the disc 53. This member 57 is not engaged by the arm 41 when such arm is raised by the cam 37. Such arm normally lies flat on the upper surface of the disc 53 when not raised, and it has a cam face 61 which lies in the path of the member 57 as it rotates and causes movement thereof to retract the pin 54 from any hole 52 in which it may be located. Thus, the disc 53 will be connected to the ring 51 when the arm 41 is raised, and will remain so until the member 57 is retracted by contact with the cam face 61 of the arm 41 after this arm is lowered, which in turn retracts the pin 54. The ring 51 is connected to the flywheel 24 as will be presently described, so that as is now apparent, the two shafts 16 and 23 will be connected to each other for one revolution by raising the arm 41 long enough to permit the member 57 to pass under it. Raising the arm 41 for a moment results in one revolution of the shaft 16; and maintaining it raised for a time which is a little longer than that required for one revolution of the shaft 16 results in two revolutions thereof. The cam 37 causes two revolutions of the shaft 16 for each announcement, in this manner, and unyielding connection between the ring 51 and the flywheel 24 would result in starting the rotation of the records at full speed, which might result in damage. To avoid this, a yielding connection is provided by a pin 62 attached to the ring 51 and projecting through an opening 63 in the periphery of the flywheel, with a tension spring 64 attached to such pin and to the flywheel, as seen on Figure 7. The slight lag due to the more gradual starting of the rotation of the discs occurs during the spacing between time announcement recordings and thus has no bad effects on the reproduction.

The gear 33 has a projecting lug or tooth 71 on its face. A rotatable ratchet or gear 72 having teeth 73 spaced apart from each other is located in a plane passing through the tooth 71, so that such tooth, on each revolution of the gear 33, strikes a tooth 73 and rotates the ratchet 72, which thus functions as an intermittently driven gear. This gear has 60 teeth, and with the gear 33 rotating continuously at 1 R. P. M. the gear 72 will be rotated intermittently 60 times per hour through 6°, or at the rate of one revolution per hour (1 R. P. H.). The gear 72 carries on its face a tooth 74 which intermittenly drives the means for controlling all the individual pickup devices 17, 18, 19 and 20 for the individual record discs 11, 12, 13 and 14, respectively.

The pickups 17, 18, 19, 20 are supported by upstanding rods 75, 76, 77, 78, respectively, the lower end 79 of each of which is a projecting ball to form a ball bearing. Only one of these at a time is in lower position for the pickup needle to contact the record disc, while the others are held in raised position so that the corresponding pickup needles will be out of contact with their respective records. As each pickup finishes announcing from its respective record, it is automatically moved into raised inoperative position and the pickup corresponding to the next record in the series is automatically lowered to operative position. When the last of the records of the series has been played, the first of the series follows the last one thereof, the pickups operating in the following sequence: 17, 18, 19, 20, 17, 18 and so on, continuously. With this in view, the balls at the lower ends of the rods 75, 76, 77, 78 rest on a cam 81 (Figures 1 and 5) which revolves in timed relation to the records and to the time of the day. The cam member 81 may comprise a flanged disc, the flange having a high portion 82 and a low portion 83, connected by oblique portions 84. The high portion 82 corresponds to a nine hour period and extends through 270 degrees, the low portion 83 extends through 60 degrees, and the two oblique portions 84 together extend through 30 degrees. The low and oblique portions together extend through 90 degrees and correspond to a three hour period. The low portion extends through only two-thirds of ninety degrees, that is, 60 degrees, because the cam rotates only intermittently. Thus each record is inoperative for a nine hour period regardless of its rotation and is operative for a three hour period, the sequence of operation being as explained above.

The cam member 81 is fastened on a shaft 85 to which is affixed a gear 86, which meshes with a gear 87, which in turn meshes with a gear 88, the gears 86, 87 and 88 preferably having twenty-four teeth each and each making one revolution in twelve hours. A gear 91 meshes with and drives the gear 88 and has the same characteristics as the gear 88 except that alternate teeth are absent. As the gear 72 rotates, the tooth 74 thereon meshes with the gear 91 and causes intermittent revolution thereof, once for each revolution of the gear 72. The arc of each such intermittent movement of the gear 91 corresponds to that of two teeth on the gear 88. The gear 91 and the gears 88, 87 and 86, thus makes one revolution each in twelve hours, since the gear 72 and the tooth 74 make one revolution in one hour. The cam 81 thus makes one revolution in twelve hours, and each time it is actuated by the tooth 74, once an hour, it travels through thirty degrees, that is, one-twelfth of a complete revolution.

Figure 8:
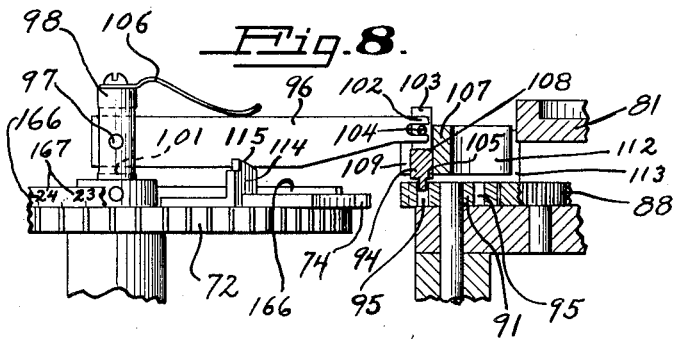
Figure 8 is a vertical section on an enlarged scale on the line 8—8 on Figure 4.

Means are provided to prevent idle motion of the gear 72 and of the cam 81. A pawl 92 (Figure 4) is resiliently pressed against the periphery of the gear 72 by a tension spring 93, and prevents any backward rotation of the gear 72, permits such gear to be driven forwardly by the tooth 71 as indicated by the arrow (Figure 5), prevents idle forward movement thereof, and maintains it in proper position to receive the tooth 71. The gear 72 can also be rotated forwardly manually if not engaged by the tooth 71, both when the machine is in operation and at rest. The cam 81 is locked in fixed position at all times, except when it is to be rotated by the tooth 74 and the gears 91, 88, 87 and 86, or except when it is to be adjusted. Such locking is preferably accomplished by a pin 94 which is insertable into one of a series of holes 95 in the gear 91. An arm 96 (Figure 8) is connected by a pivot pin 97 to a fixed post 98, one end of the arm passing through a slot 101 in such post. The pin 94 is pivotally and slidably attached adjacent the other end of such arm. Such end is preferably forked as shown at 102 and is located within a slot 103 in the pin 94. A pin 104 is fixed in position across such slot and lies within the forked end 102. This not only permits of sliding pivotal connection between the pin 94 and the arm 96, but also of easy and quick insertion and removal of the pin. Such pin has a shoulder 105 to prevent insertion thereof to too great an extent into any of the holes 95, and such insertion is preferably not only by gravity but is made positive by a spring 106 urging the arm 96 downwardly by pressing thereon. A guide 107 is preferably provided to maintain the pin 94 and the end 102 of the arm 96 in their proper paths. This guide has a hole 108 in which the pin 94 can slide and a slot 109 connecting such hole with the surface of the guide and in which the forked end of the arm 96 can slide. The guide preferably has elongated sides 112 to which supporting plates 113 are attached. Means are provided to retract the pin 94 from any hole 95 in which it is located, at the proper time to permit rotation of the gear 91 by the tooth 74. A cam 114 having a sloping upper face 115 is attached to the gear 72 in such position that it strikes the lower face of the arm 96 and raises it sufficiently to withdraw the pin 94 from the hole 95 just before the tooth 74 begins to rotate the gear 91, and is so shaped that it permits the arm 96 to drop quickly sufficiently for the pin to enter the hole brought into position thereunder by the rotation of the gear 91. The gear 91, and the other members interconnected with it, are thus locked against rotation except when the tooth 74 is causing rotation thereof.

Figure 4:
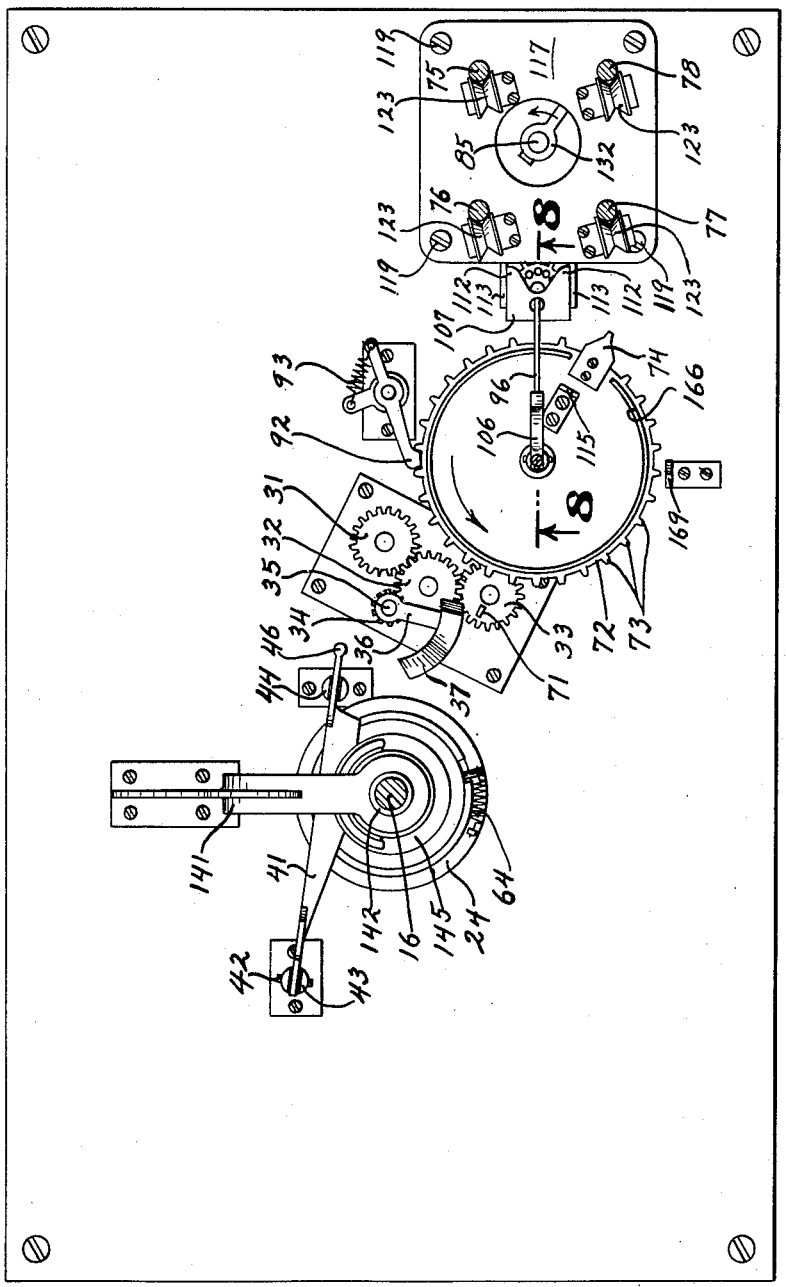
Figure 4 is a horizontal section on the line 4—4 on Figure 1.
Figure 5:
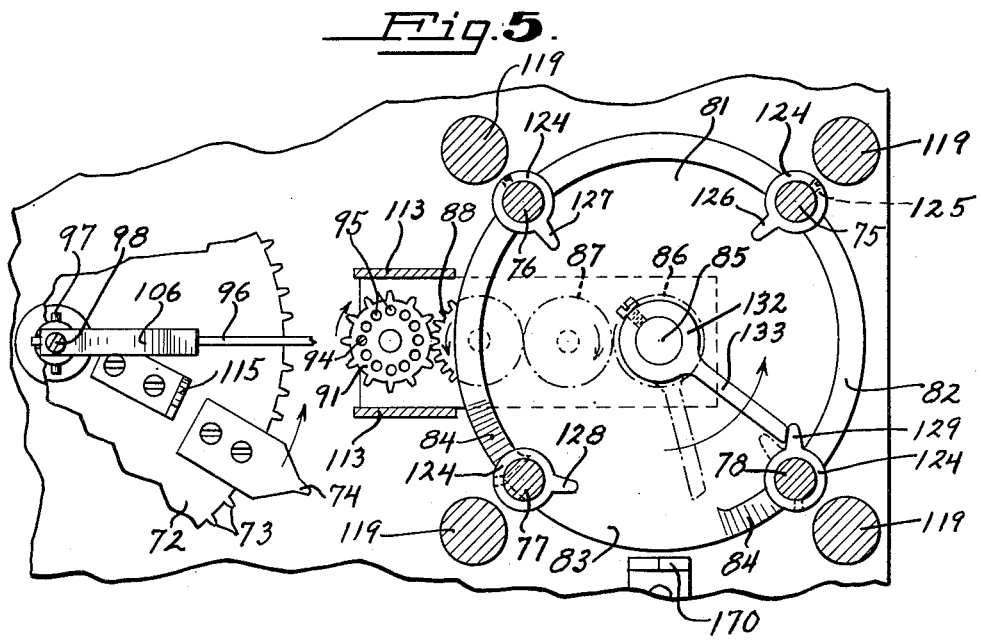
Figure 5 is a horizontal section broken away and on an enlarged scale, on the line 5—5 on Figure 1.

Referring to Figures 1, 4 and 5, the rods 75, 76, 77 and 78 which support and move their respective pickup devices pass through holes in superposed plates 117 and 118 which are supported by posts 119 and 120. The leverage of the pickup devices on such rods, due to the weight thereof, which is unbalanced in each instance, may tend to cause binding of the rods against the edges of the holes. Grooved rollers 123 against which the rods can easily move and located on the side of each rod in the general direction of the pickup devices, avoid or reduce such tendency to bind.

The rods 75, 76, 77 and 78 not only can move lengthwise in the holes in the plates 117, 118, but can also move rotatably therein to permit the pickup to follow the path of the recording. Means are provided to position the pickup needle automatically at the beginning of the recording. It is preferred to accomplish such automatic positioning adjacent the center of the record rather than at a point near the periphery thereof, and the path of the recording which is spiral is therefore made to begin at the inside of the spiral and end at the outside, contrary to customary practice.

Figure 2:
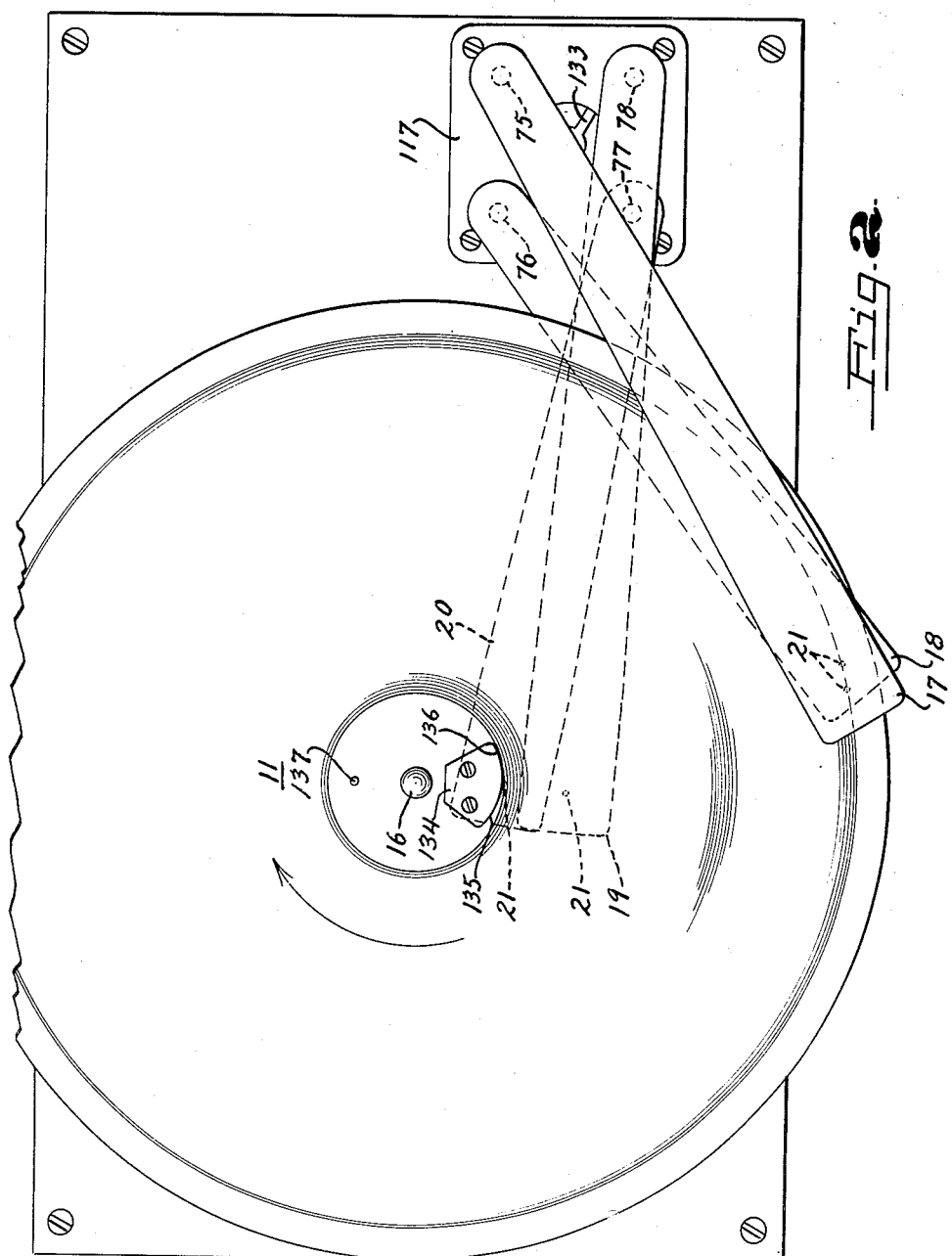
Figure 2 is a plan view thereof.

On each of the pickup-carrying rods 75, 76, 77 and 78 is a collar 124 each of which can be fastened in adjusted position on its respective rod by any suitable means such, for example, as a screw 125. Each such collar carries a lug 126, 127, 128 and 129, respectively, projecting in the general direction of the shaft 85. On such shaft is a collar 132 which can be fixed in adjusted position to the shaft and carries an arm 133 which is of a length to strike any of the lugs 126, 127, 128 and 129 as it approaches it, and turn it as shown in full and dotted lines on Figure 5. The arm 133 revolves intermittently with the cam 81, making one complete revolution every twelve hours therewith. The turning of any of the lugs 126, 127, 128 or 129 turns the respective rod and swings the respective pickup device, and in each instance positions the pickup needle in a path on the respective record to pick up the recording at its beginning. Each record is provided with a cam 134 of which the outer edge is cam-shaped. The part 135 of this edge is closer to the center of the record than the part 136 of which the right hand end as seen on Figure 2 is located from the center of the record just far enough to position the pickup needle at a point to ride in the beginning of the recording.

Means are provided to cause the record to present the right part of the recording to the pickup needle at the right time. Any type marker or means to position the record in the right angular position with respect to the turntable upon which it is to rest may be used, for example a pin 137 (Figure 2) on the turntable which can register and fit into a corresponding indentation in the record.

Figure 3:
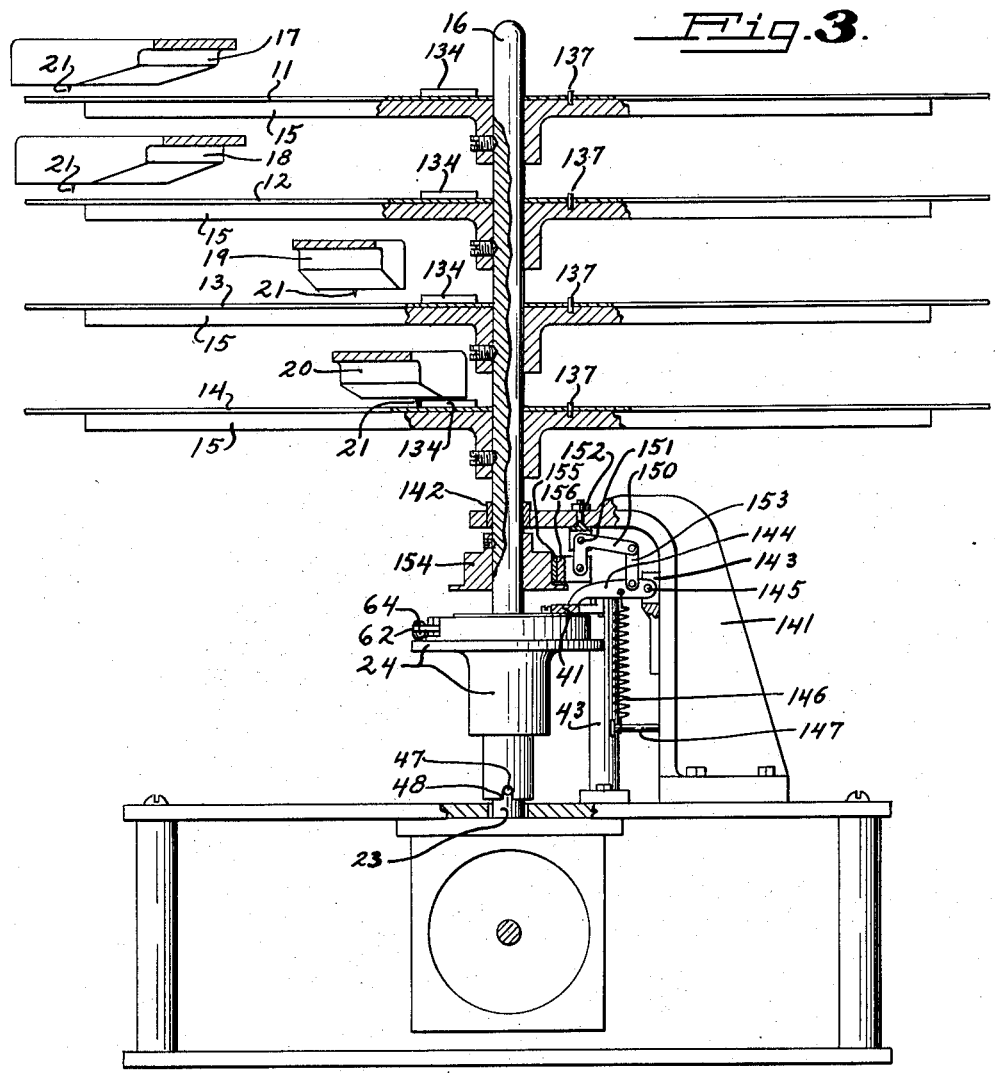
Figure 3 is a vertical elevation, partially in section, looking to the left in Figure 1.

Means are provided to prevent overrunning or coasting of the records when an announcement has been completed. This preferably comprises a brake which is automatically applied at the moment that revolution of the record should cease and is automatically released at the moment that the record should begin to turn. Such a brake is illustrated on Figures 3, 4 and 6. A standard 141 supports a bearing 142 for the shaft 16. This standard carries a slotted member 143. An end of an arm 144 is located in the slot thereof and connected to the slotted member by a pivot pin 145. The other end of the arm 144 rests upon the upper face of the arm 41 and is maintained in contact therewith by a tension spring 146 connected thereto and to a pin 147 conveniently mounted on the standard. A bellcrank lever 150 is pivotally mounted at 151 on a support 152 carried by the standard 141. A link 153 is pivoted at one end thereof to the arm 144 and at the other end to one arm of the bellcrank lever. A brake drum 154 is attached to the shaft 16 and about a portion thereof extends a brake band 155 carried by a support 156 to which the other arm of the bellcrank lever is pivotally connected. Raising of the arm 144 will retract the brake from the drum, and lowering such arm will apply it. The arm 144 is raised only when the arm 41 is raised by the rotating cam 37, so that the brake is retracted only to permit the desired rotation of the record, and is applied by the spring 146 at all other times.

Figure 9:
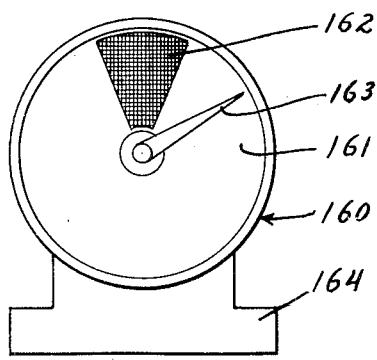
Figure 9 is an elevation of a device to aid the person in timing his spoken words in making the record or records.

The person who speaks the time or other announcements for the purpose of making the records, is guided by a timing device illustrated on Figure 9. A dial 160 is subdivided arcuately into two portions, having different appearances, the larger 161 being for example white, and the smaller 162 for example black. An indicator hand 163 rotates continuously before the dial, being driven by a synchronized motor (not shown) at a speed of 16⅔ R. P. M. to make one revolution in the time required for the shaft 16 to make two revolutions. The record revolves at the same speed while recording, as while reproducing or announcing. The time required for the indicator to make one revolution is the time required for an announcement plus the respective silent periods, the silent periods including the periods during which the record is slowing down, at rest, and accelerating in speed while starting. The part 162 of the dial 160 corresponds to such silent periods while the part 161 corresponds to the speaking period, both in announcing and in making the record. The dark part 162 calling for silence on the part of the person making the record extends over an angle of about 45 degrees, this generally being sufficient to cover the period that the record will be stopping, at rest, and starting, when used in the announcing machine. The speaker thus has only to watch the dial and indicator, speak and complete what he has to say to be recorded while the indicator is travelling over the part 161, and be silent while it is travelling over the part 162. This avoids any recording on that part of the record contacted by the pickup needle while the record is stopping, at rest, or starting. The timing device is preferably mounted on a supporting base, such as that shown at 164, or on any other suitable base or support, for the purpose of positioning it in front of the speaker so that he can see it conveniently while making the records. It is used only for making records which are particularly of value in the announcing machine.

For starting the announcing machine so that it will automatically announce correct times thereafter, it is of course necessary to have the proper record contacted by its respective pickup needle. This is done by manually raising the arm 96 to withdraw the pin 94, and then rotating the cam 81 manually to the proper position, whereupon the arm 96 is released. The current is supplied to the driving motor so that the machine starts running at one-half-minute past twelve, three, six or nine, as the case may be, whereupon the machine functions automatically.

It is, however, not necessary to wait for any of the particular times indicated, and the machine can be started at any time. With the proper pickup in operative position on a part of the record where the announcement is of an earlier than actual time, the motor is started and allowed to run continuously. The arm 41 is then held up manually, which results in continuous revolution of the record while the machine is running, and in continuous announcing by the record instead of at half-minute intervals. The record thus gains on the machine because it runs faster than normally. Since two revolutions of the records require about four to five seconds out of every thirty seconds, the records will gain on the machine at a rate of about six to one. The arm 41 is released and allowed to function normally just as the record is about to announce correct time. This may result in the machine being out of phase with correct time, in which case the arm 41 is maintained raised or raised again to make the announcements a little fast or ahead of correct time. Thereupon the current to the motor is cut off for the necessary period of time to let correct time catch up with the machine, whereupon the current is again supplied to the motor and the machine then operates automatically to announce correct time. As a general rule, it is simpler to set the machine fast and then retard it as just explained.

Certain features are useful in "setting" the machine as it is about to be put into operation. For example, numerals or other signs may be carried by the gear 72 and the cam 81, with indicators adjacent them so that such gear and cam can be put manually into proper positions as indicated by the numeral opposite the respective indicator. For example, the gear 72 may carry an upstanding ring 166 on which are a series 167 of numerals 1–60, inclusive, evenly spaced thereabout, and a series 168 of numerals 1–12, inclusive, may be evenly spaced about the cam 81. Cooperating with the series 167 is a fixed indicator 169, and cooperating with the series 168 is a fixed indicator 170. By placing proper numerals in proper relation to these indicators, a close approximation or an exact timing of the machine with respect to the correct time of day results.

The preferred embodiment of the invention as described herein announces the time of day periodically at half-minute intervals. The records make two revolutions for each announcement, the two revolutions extending through a period of time of the order of about five seconds. It is desirable to have the distance of the path on the record traversed by the pickup needle slightly greater than that required for the actual announcement, as a matter of safety. The record is running or rotating at full speed during reproduction of the recorded announcements, acceleration up to full speed and deceleration therefrom occurring with the respective pickup needle in contact with silent parts of the record. These silent parts of the record are very small as compared to the announcing parts of the record, so that only a small portion of the record is wasted. Some is wasted as a factor of safety, and some is wasted because different times of day do not necessarily require the same duration of time to announce, as for example, "twenty-seven and one-half minutes past eleven" requires a longer time than "one o'clock." The silent part of the record as a whole can be reduced to a minimum by means of this invention, having it just sufficient to permit starting and stopping and to take care of the added silent period when the announcements are of short duration. The life of the record is prolonged by having the starting and stopping thereof gradual.

With an understanding of this invention it is a simple matter to change the periodic time announcement intervals to any desired, whether greater or less than one half-minute, provided announcements which can be understood can be made in the allotted period of time. The invention may be used also for making any desired announcements, for example, advertising matter, for announcing special sales at certain locations in stores, in railroad stations for announcing the time of train arrivals and departures, and it may be used for other purposes as well. The machine may be used in various ways; for example, it may be left running indefinitely or only at desired periods of time. It may also be left running continuously and the power for the amplifier cut off over week ends and holidays when used in stores, so that there will be no necessity for again starting the machine; and it may also be used otherwise than specifically described.

Certain details have been referred to and illustrated merely to explain the invention without limiting it, and can be varied without departing from the spirit thereof.

The invention claimed is:

1. A device for making the record portion of an automatic machine for announcing correct time by voice, comprising a turntable, a record supported thereon and adapted to have periodic time announcements recorded thereon, the distance between adjacent recordings being less than corresponds to the actual time period between said announcements, means to record said announcements on said record comprising a pickup device in sound transcribing engagement with said record, motive power means connectable to said turntable to cause relative motion at reproduction speed between said record and said pickup device, means interconnecting said motive power means and said turntable and operable in timed relation to said motive power means to cause a pause in said relative motion between adjacent announcement recordings, an indicator device mounted in a position where viewable by an announcer comprising a dial and a pointer mounted for relative movement with respect to said dial, said dial having a first segmental portion indicating when the announcer is to speak and a second segmental portion indicating when he is to be silent, said segmental portions together constituting the full 360 degrees of said dial, and means connected to one of said dial and pointer elements to cause relative motion therebetween in timed relation with the cycle of intermittent relative movement between said record and said pickup device, the time required for said pointer to traverse the "speak" portion of said dial being at least as great as and in phase with the time required for making an announcement, and the time required for said pointer to traverse the "silent" portion of said dial being at least as great as and in phase with said pause and acceleration and deceleration of the turntable coincident therewith.

2. A sound reproducing machine comprising a plurality of turntables, a record on each turntable, a common rotational support for said turntables, motive power means in driving relation to said common rotational support to rotate the same and thereby said records, a separate pickup device for each record, and movable means associated with said pickup devices and operable in timed relation with said motive power means to cause operative relation between each pickup device and its record consecutively and repeatedly in fully automatic sequence, said associated means comprising a cam supporting said pickup devices.

3. An automatic machine for periodically announcing correct time by voice comprising a rotatable shaft, a plurality of record supports fixed to said shaft, records on said supports, said records having periodic time announcements recorded thereon with spaces therebetween, said spaces being less than correspond to the actual time periods between said announcements, said recordings on individual records covering a fraction of the period of time indicated on a clock dial and together covering said period, a second shaft in alignment with said first-mentioned shaft, motive power means connected to said second shaft to rotate the same, clutch elements carried by said shafts, means operable in timed relation with said motive power means to connect and disconnect said clutch elements in relation to said recorded announcements and spaces, a separate pickup for each record, and movable means associated with said pickup devices and operable in timed relation with the rotation of said second shaft to cause said pickup devices to become operative consecutively one at a time with their respective records, said movable associated means comprising a cam supporting said pickup devices.

4. An automatic machine for periodically announcing correct time by voice comprising a vertical rotatable shaft, superposed turntables fixed to said shaft, a record on each turntable, said records having periodic time announcements recorded thereon with spaces therebetween, said recordings being in a spiral path having a beginning inwardly and an ending outwardly of each record and covering a fraction of the period of time indicated on a clock dial and together covering said period, said spaces being less than correspond to the actual time periods between said announcements, a second vertical shaft axially of and under said first mentioned shaft, means to clutch said shafts together comprising a spring-pressed retractible pin carried by one of said shafts and a member carried by the other of said shafts having a plurality of pin receiving holes therein, a pivotally mounted arm having a cam face in engagement with said pin during one position of operation and operable when lifted to permit engagement of said pin in one of said holes to clutch said shafts together, motive power means connected to said second shaft for rotating the same, a cam movable in timed relation to the rotation of said second shaft and operable to lift said arm in timed relation to said recordings and spaces, a separate pickup device for each record, a separate vertically movable and rotatable support for each pickup device, a cam member supporting said vertically movable and rotatable supports and operable upon rotation to bring said pickup devices into operative relation consecutively one at a time with their respective records in timed relation to said recordings, means connected to said cam member for rotating the same in timed relation to the movement of said second shaft, and means operable to return said pickup devices to the beginnings of said recordings comprising arms on said supports for said pickup devices, an arm carried with said rotatable cam member and operable to engage the arms on said supports to rotate said pickup supports individually when said supports are in a raised position to swing said pickup devices toward and behind said spiral path, and a cam carried adjacent the center of each record and operable to direct the pickup device associated with each record into the beginning of the spiral path.

5. An automatic machine for periodically announcing correct time by voice comprising a rotatable shaft, a plurality of spaced turntables fixed to said shaft, a record on each turntable having a spiral track with a beginning inwardly of the record and ending outwardly of the record, a second shaft in axial alignment with said first shaft, complementary clutch elements carried by said shafts, motive power means connected to said second shaft for driving the same, a pickup device for each record, independent support members for each device, said members being rotatable and vertically movable, an arm on each support member, a rotatable member having a cam element supporting said support members and operable upon rotation to sequentially lower and raise said pickup devices into and out of sound reproducing engagement with said records, an arm carried with said rotatable member and sequentially engageable with said support member arms when the pickup devices associated with said arms are in the raised position to pivot said pickup devices from the ending to the beginning of the spiral tracks of their respective records, and transmission means interconnecting said motive power means and said rotatable member for rotating the latter, said transmission means including a cyclically movable cam member operable to actuate means associated with said clutch elements to intermittently engage and disengage said elements.

6. The time announcing machine set forth in claim 5, wherein said records are provided with cam members fixed thereto and adapted to direct the pickup devices into engagement with the beginning of the sound tracks upon the lowering of said devices.

7. The time announcing machine set forth in claim 6, wherein said clutch elements comprise a spring-pressed pin carried by one shaft and a member carried by the other shaft having a plurality of pin-receiving holes therein, and wherein said means associated with said clutch elements comprise a pivotally mounted arm having a cam face in engagement with said pin during one position of operation and operable when lifted by the cam member included in the transmission means to cause engagement of said pin in one of said holes to clutch said shafts together.

8. The time announcing machine set forth in claim 7, wherein a yieldable connection is provided between one of said shafts and the clutch element associated therewith to allow for the gradual transmission of the torque of the driven shaft to the rotatable shaft upon the engagement of said clutch elements.

HARRY G. LUNDGREN.
ERIC H. LUNDGREN.

REFERENCES CITED

The following references are of record in the file of this patent:

UNITED STATES PATENTS

| Number | Name | Date |
| --- | --- | --- |
| 1,063,085 | Thormeyer | May 27, 1913 |
| 1,079,419 | MacDonald | Nov. 25, 1913 |
| 1,262,521 | Knights | Apr. 9, 1918 |
| 1,407,547 | Kellogg | Feb. 21, 1922 |
| 1,483,751 | Slingland | Feb. 12, 1924 |
| 1,784,439 | Kent | Dec. 9, 1930 |
| 1,859,153 | O'Leary | May 17, 1932 |
| 1,942,677 | Wood | Jan. 9, 1934 |
| 1,998,105 | Sullivan | Apr. 16, 1935 |
| 2,034,105 | Lughridge | Mar. 17, 1936 |
| 2,135,035 | Heacock | Nov. 1, 1938 |
| 2,201,204 | Runyan | May 21, 1940 |
| 2,239,215 | Banks | Apr. 22, 1941 |

FOREIGN PATENTS

| Number | Country | Date |
| --- | --- | --- |
| 231,755 | Germany | Mar. 2, 1911 |
| 274,742 | Germany | May 28, 1914 |
| 284,904 | Germany | June 11, 1915 |
| 96,495 | Switzerland | Oct. 16, 1922 |
| 475,602 | Germany | May 2, 1929 |
| 363,391 | Great Britain | Dec. 11, 1931 |
| 545,531 | Germany | Mar. 2, 1932 |
| 588,675 | Germany | Nov. 23, 1933 |